United States Patent [19]

Belart et al.

[11] Patent Number: 4,708,405

[45] Date of Patent: Nov. 24, 1987

[54] BRAKE PRESSURE GENERATOR FOR A HYDRAULIC BRAKE SYSTEM FOR USE WITH MOTOR VEHICLES

[75] Inventors: Juan Belart, Walldorf; Wolfram Seibert, Darmstadt; Norbert Ocvirk, Offenbach, all of Fed. Rep. of Germany

[73] Assignee: Alfred Teves GmbH, Frankfurt am Main, Fed. Rep. of Germany

[21] Appl. No.: 822,024

[22] Filed: Jan. 24, 1986

[30] Foreign Application Priority Data

Jan. 24, 1985 [DE] Fed. Rep. of Germany ....... 3502281

[51] Int. Cl.$^4$ ..................... B60T 8/44; B60T 13/00; B60T 8/36
[52] U.S. Cl. .................................. 303/114; 60/547.1; 303/119
[58] Field of Search ............... 303/114, 119, 116, 113, 303/91, 100; 60/547.1, 581, 561; 188/181 A, 181 C

[56] References Cited

U.S. PATENT DOCUMENTS 4,523,791  6/1985  Belart et al. ................. 303/114 X
4,586,591  5/1986  Belart .......................... 303/114 X

FOREIGN PATENT DOCUMENTS 2942980  5/1981  Fed. Rep. of Germany .
3338322  5/1985  Fed. Rep. of Germany .
2141195  12/1984 United Kingdom .
2148430  5/1985  United Kingdom ............. 303/114

Primary Examiner—Andres Kashnikow
Assistant Examiner—Robert J. Oberleitner
Attorney, Agent, or Firm—James B. Raden; Robert P. Seitter

[57] ABSTRACT

A brake pressure generator for a hydraulic brake system for motor vehicles, comprising a booster piston (26) displaceable by a hydraulic auxiliary pressure in the actuating direction, comprising a master cylinder (2) including a stepped piston (36) to which piston pressure can be applied by a booster piston (26). The piston (36) confines a work chamber (48) and a chamber (56) decreasing in size upon movement of the piston in the actuating direction, which chamber (56), by way of a non-return valve, is on communication with the work chamber (48) and from which a conduit leads to a non-pressurized container (168), with the conduit being provided with a control valve (86). To permit employment of the brake pressure generator in slip-controlled systems a slip control is provided comprising a valve (182), by way of which, during slip control, controlled hydraulic auxiliary pressure can be supplied to the chamber (56) decreasing in size upon movement of the piston (36) in the actuating direction. A second chamber increasing in size upon movement of the piston in the actuating direction is confined by piston (36), with the said chamber, by way of a connecting line (142, 136) being in communication with the chamber (56) decreasing in size by the piston movement. A shut-off valve is provided in the connecting line in order to block the enlarging chamber during slip control.

5 Claims, 1 Drawing Figure

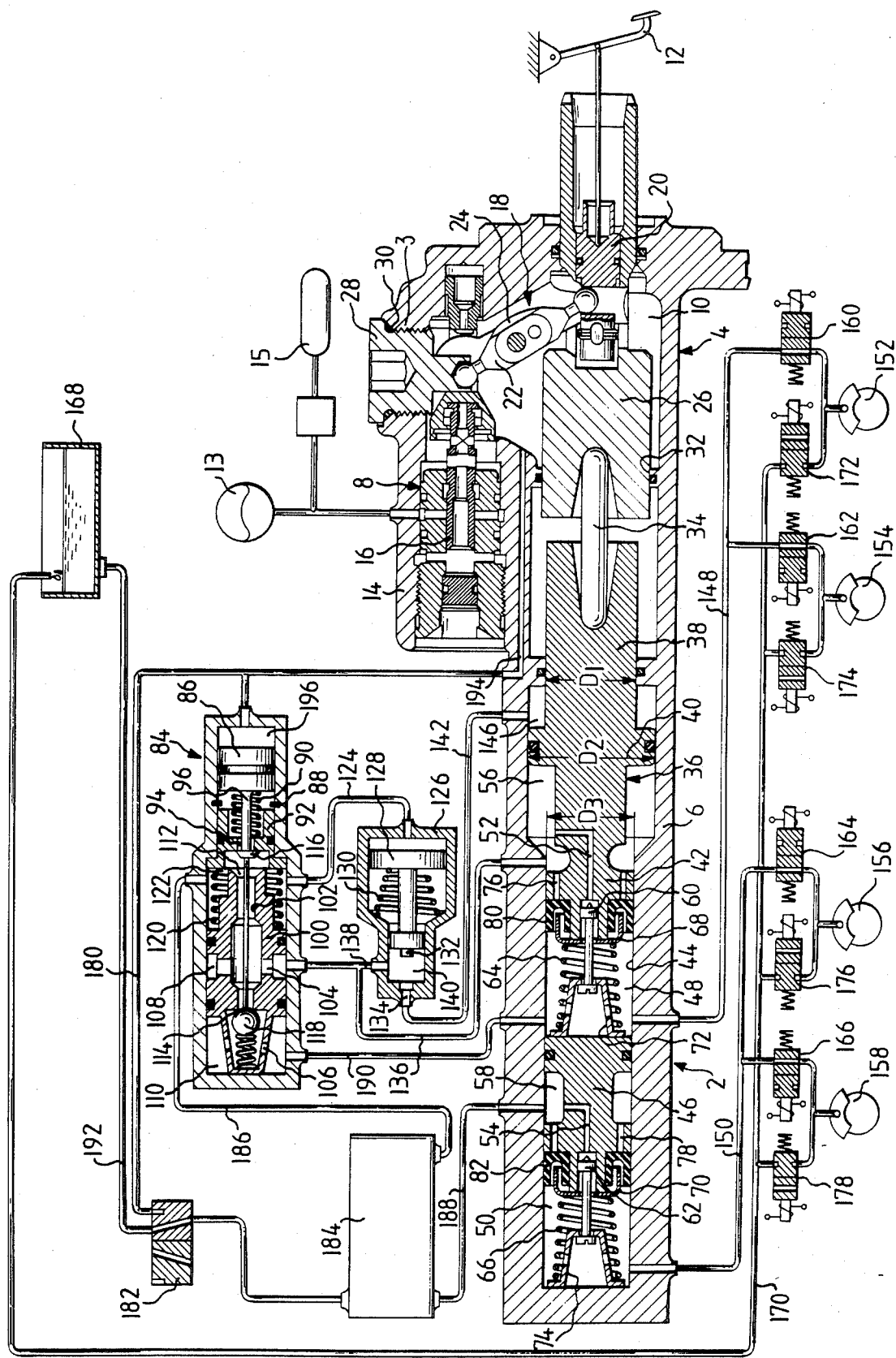

BRAKE PRESSURE GENERATOR FOR A HYDRAULIC BRAKE SYSTEM FOR USE WITH MOTOR VEHICLES

BACKGROUND OF THE INVENTION

The present invention relates to a brake pressure generator for a hydraulic brake system for use with motor vehicles, comprising a booster piston displaceable in the actuating direction by a hydraulic auxiliary pressure, and comprising a master cylinder including a stepped piston to which pressure can be applied by the booster piston. The piston confines a work chamber and a chamber decreasing in size upon movement of the piston in the actuating direction, which chamber is in communication with the work chamber by way of a check valve and from which a conduit comprising a control valve leads to a non-pressurized container.

A brake pressure generator of this type is described in published German Patent Application P 34 28 136.3. According to the patent application, the brake pressure generator comprises a hydraulic force booster in the pressure chamber of which a hydraulic auxiliary pressure is adjustable by means of a brake valve which auxiliary pressure is proportional to the operating force respectively exerted on the brake pedal. A component part of the hydraulic force booster is a booster piston which, in a sealed manner, is displaceably disposed in a bore of the hydraulic force booster to displace a master cylinder piston in the actuating direction as soon as an adequately high pressure has built up in the pressure chamber of the hydraulic force booster. The booster piston is substantially of a stepped-piston configuration, with an annular chamber being formed between the piston step of smaller diameter and the housing of the brake pressure generator, which annular chamber decreases in size when the brakes are applied. In the brake releasing condition, the annular chamber is in communication with a non-pressurized container by way of a control valve. When force is applied to the brake pedal, a hydraulic pressure is built up in the pressure chamber of the hydraulic force booster which results in that the valve passage of the control switch between the annular chamber of the hydraulic force booster and the non-pressurized container is closed. As a pressure build-up in the booster chamber of the hydraulic force booster, conversely, results in that the work chambers of the master cylinder are separated from the non-pressurized intake reservoir as a consequence of the displacement of the booster piston in the actuating direction and of the closure caused thereby of the central valves provided in the master cylinder pistons. With a continued displacement of the booster piston, the pressure fluid volume escaping form the annular chamber, by way of a control valve, is directly supplied to the one of the work chambers of the master cylinder thereby initiating a relative movement between the master cylinder piston and the booster piston, with the master cylinder piston moving faster than the booster piston to allow high master cylinder pressures to be generated by relatively low pedal paths. In case of a failure of the auxiliary pressure supply, the control valve is held in its open position as no pressure is built up in the pressure chamber of the hydraulic force booster. By applying the brake, the booster piston is then displaced alone by exerting force to the brake pedal, with the volume displaced from the annular chamber escaping into the non-pressurized container. Hence, no transmission will take place by displacement of the volume into the work chamber. The prior art brake pressure generator is largely satisfactory in operation in that the desired abrupt change in ratio is attained in a favorable manner. However, it is not suitable for use with brake systems including a slip control.

It is, therefore, the object of the present invention to provide a brake pressure generator of the type described that can be used with brake systems comprising a slip control.

SUMMARY OF THE INVENTION

In the practice of the present invention, this problem is solved in that a slip control comprising a valve is provided by way of which, during slip control, hydraulic auxiliary pressure can be fed to the chamber decreasing in size upon movement of the piston in the actuating direction, and wherein a second chamber enlarging upon movement of the piston in the actuating direction, is confined by the piston, which chamber, by way of a connecting line, is in communication with the chamber decreasing in size by the piston movement, with a shut-off valve blocking during slip control being provided in the connecting line.

The invention provides a brake pressure generator for a hydraulic brake system furnished with a slip control, in which, on the one hand, an abrupt change in ratio is safeguarded. That is, in which in case of failure of the hydraulic auxiliary pressure, the ratio is precluded such that the motor can still be decelerated by normal pedal force. On the other hand, it is safeguarded that, during slip control, an adequate reserve stroke of the master cylinder piston is maintained which is ensured by the shut-off valve blocking the connecting line between the chamber enlarging upon movement in the actuating direction and the chamber decreasing in size upon actuation to thereby maintain the volume of the enlarging chamber and precluding a return movement of the piston as a result of the controlled pressure prevailing in the chamber decreasing in size.

According to a preferred embodiment of the present invention, the effective piston surface of the master cylinder piston confining the decreasing chamber is larger than the effective piston surface confining the enlarging chamber. The piston is, therefore, always urged by an adequate force against the volume enclosed by the enlarging chamber. According to another embodiment of the present invention, the valve by way of which hydraulic auxiliary pressure can be supplied to the chamber decreasing in size upon movement of the piston in the actuating direction during slip control, is assembled in a conduit which leads into the said chamber by way of the said control valve. The shut-off valve can be blocked in response to the controlled hydraulic auxiliary pressure. According to a preferred embodiment, it comprises a piston axially displaceable against the force of a spring, with controlled hydraulic auxiliary pressure being applicable to the one side of said piston.

According to another embodiment of the present invention, a pressurizable container is disposed in the line by way of which hydraulic auxiliary pressure can be supplied to the decreasing chamber. The controlled hydraulic pressure is supplied to the work chamber of the master cylinder confined by the stepped piston by way of the control valve. In a tandem master cylinder, in which the master cylinder comprises another piston confining another work chamber for an additional brake circuit, controlled pressure can be supplied to the work chamber for the additional brake circuit during slip control. To reduce the master cylinder in diameter, the two master cylinder pistons are arranged in series.

BRIEF DESCRIPTION OF THE DRAWING

The invention will now be described in conjunction with the accompanying drawing wherein the single FIGURE illustrates a brake pressure generator for hydraulic brake systems in accordance with the present invention.

DETAILED DESCRIPTION

In the drawing, numeral 2 generally refers to a tandem master cylinder operable by a hydraulic force booster 4. The tandem master cylinder 2 and the hydraulic force booster 4 are accommodated in a housing 6. The hydraulic force booster 4, as shown to the right of the drawing, comprises a brake valve 8 and a pressure chamber 10, with a hydraulic auxiliary pressure being suitably supplied in controlled manner into the pressure chamber 10 of the hydraulic force booster by way of a brake pedal 12, which auxiliary pressure is proportional to the actuating force F respectively exerted on brake pedal 12. The hydraulic auxiliary pressure is supplied by a pump 13 including a reservoir 15.

Brake valve 8 is in the form of a gate valve substantially comprising a valve housing 14 in which is disposed a control slide valve 16. Control slide valve 16 is displaceable within a bore of the valve housing 14. Control slide valve 16, by way of a double lever 18, is in mechanical contact with a plunger rod 20 to which pressure can be directly applied by brake pedal 12. A first lever 22 of the lever operation 18, on the one hand, is disposed in housing 6 and, on the other hand, engages a recess in the plunger rod 20. Pivotally disposed on first lever 22 is a second lever 24 which, on the one hand, is supported on control slide 16 of brake valve 8 and, on the other hand, on the booster piston of the hydraulic force booster 4. The upper end of the first lever 22 is of a spherical configuration received by a screw-in portion 28 which, employing a seal 30, is firmly screwed into housing 3.

The booster piston 26, in sealed way, is slidably guided in a bore 32 and, by way of a plunger rod 34, is supported on a master cylinder piston 36. The master cylinder piston 36 is of a stepped configuration substantially forming three sections of different diameters. The first section 38 facing the booster piston 26 is of diameter D1; the second section 40 following the former is of diameter D2, whereas the third section 42 has a diameter D3 wherein $D_2 > D_1$ and $D_2 > D_3$.

The third section 42 protrudes into a correspondingly dimensioned master cylinder bore 44 provided in housing 6. Moreover, a float piston 46 is disposed in the master cylinder bore 44, which float piston along with the master cylinder piston 36, on the one hand, confines a first work chamber 48 and, on the opposite side, confines a second work chamber 50. Both, in master cylinder piston 36 and in float piston 46, are provided intake channels 52, 54 leading from annular intake chamber 56, 58 to work chambers 48, 50 and being closable by means of central valve elements 60, 62. For actuating central valve elements 60, 62, springs 64, 66 are provided and clamped between spring retainers 68, 70 and spring sleeves 72, 74 captured by central valve elements 60, 62. The master cylinder pistons 36, 46, moreover, comprise channels 76, 78 extending in a direction substantially axial-parallel and equally leading from the intake chambers 56, 58 to the work chambers 48, 50 and being closable by a check-valve-type sealing cup 80, 82.

A further component of the brake system of the present invention is a valve 84 in which a piston 86 to which controlled pressure can be applied, is displaceable against a stop 88. The piston, 86, is supported by way of first compression spring 90 on a annular piston 92 comprising a continuous opening 94 through which is guided an axially extending extension 96 of piston 86. A piston member 100 comprises a multiply stepped central bore 102 in which extends extension 96 of piston 86. Radially extending bores 104, 106 start from the central bore 102 and terminate in corresponding annular chamber 108, 110 formed by piston member 100. Piston member 100 forms two valve seats 112, 114 closable by means of closure members 116, 118 with closure member 116 being firmly connected to extension 96 of piston 86, while closure member 118 is formed by a resiliently supported ball. A second compression spring 120, on the one hand, is supported on piston member 100 and, on the other hand, is supported on annular piston 92. Provided between piston member 100 and annular piston 92 is a second annular chamber 122.

Moreover, the brake pressure generator of the present invention includes a shut-off valve 126 comprising a piston 128 disposed in a manner axially displaceable in a valve housing, with the piston 128 being resiliently supported on the valve housing by means of a compression spring 130. One end of the valve piston 128 forms a closure member 132 closing an opening 134.

A conduit 136 leads from annular chamber 108 of valve 84 to intake chamber 56 confined by master cylinder piston 36. Starting from conduit 136, a branch conduit 138 leads to a chamber 140 of shut-off valve 126 which chamber, with the shut-off valve opened, is in communication with opening 134. Starting from opening 134 of the shut-off valve 126, a conduit 142 leads to an annular chamber 146 confined by the first and second sections of master cylinder piston 36. Work chambers 48, 50 of the tandem master cylinder 2, by way of conduits 148, 150 are in communication with the wheel brakes 152, 154, 156 and 158 with valves 160, 162, 164 and 166 being assembled in the branch conduits leading to the individual wheels. The return flow of the pressure medium from the wheel brake to the non-pressurized container 168 is effected by way of corresponding branch conduits from the wheels terminating in a manifold 170. Respective valves 172, 174, 176 and 178 equally are assembled in the return flow conduits. The valves 160–166 and 172–178 can be driven by the slip control to supply pressure medium to the wheel brakes and relieve them, respectively. Controlled pressure can be supplied to a pressurizable container 184 by way of a conduit 180 in which is provided a 3/2-way valve 182. Starting from that container, a conduit 186 leads to the annular chamber 122 of the valve 84 while a conduit 188 leads to the intake chamber 58 of the float piston 46. Last not least, a conduit 190 leads from annular chamber 110 of the valve 84 to the work chamber 48 of the master cylinder.

The operation of the brake pressure generator will now be described, beginning with the starting position as shown in the drawing, that corresponds to the brake releasing condition. In that state, work chambers 48, 50 of the master cylinder 2 are in communication with the non-pressurized container 168. With the booster being intact, the annular chamber 146 by way of conduit 142, shut-off valve 126 and conduits 138, 136 is in communication with the intake chamber 56. Closure member 116 of valve 84 is opened so that annular chamber 146 and intake chamber 56, by way of conduit 186, container 184, valve 182 and a conduit 192 are in communication with container 168. When the brake pedal 12 is actuated, a hydraulic pressure is built up in the pressure chamber 10 of the hydraulic force booster; the said pressure, by way of a conduit 194 is supplied to a chamber 196 of valve 84 which chamber is confined by piston 86.

Because of the application of pressure to piston 86, it is displaced to the left. At the same time, the booster piston 26 and the master cylinder piston 36, by way of plunger rod 84, are displaced in the actuating direction thereby causing the central valve members 60, 62 to close and a pressure to built up in the work chamber 48, 50. The pressure, by way of conduit 190, is supplied to the annular chamber 110 of the valve 84 thereby causing the piston member 100 to be displaced (to the right in the drawing). Due to the approach of the piston member 100 and of the piston 86, the closure member 116 of the piston 86 is moved against the valve seat 112 to thereby close the passageway. Upon another movement of the master cylinder piston 36, the pressure medium is thereby displaced from the intake chamber 56 into the work chamber 48 thereby causing a transmission ratio effect which is due to the large effective piston surface.

In the event of a failure of the hydraulic auxiliary pressure, the chamber 196 is pressure-relieved causing the valve to open and the intake chamber 56 to be ventilated. In that condition, it is only diameter D3 of the master cylinder piston that is effective thereby eliminating the transmission ratio.

During slip control (which, conceptionally, will be possible only with the booster being intact), valve 182 will be switched thereby causing the controlled pressure prevailing in the conduit 180 to be supplied to the container 184. Starting from the container 184, the controlled pressure, on the one hand, is fed by way of conduit 188 into the annular chamber 58 from where it is fed, by way of cup 82, into work chamber 50 and, conversely, by way of conduit 186, opened valve 84 and conduit 136 into the intake chamber 56 and from here, by way of cup 82, into work chamber 48.

The shut-off valve 126 is closed as controlled pressure acts upon the piston 128 by way of conduit 124. As the annular chamber 146, hence, is blocked and controlled pressure prevails in the intake chamber 56, master cylinder piston 36 is fixed in that position to thereby safeguard the required reserve stroke.

What is claimed is:

1. A brake pressure generator for a hydraulic brake system for use with motor vehicles comprising a booster piston displaceable by a hydraulic auxiliary pressure in an actuating direction, comprising a master cylinder having a stepped piston to which pressure can be applied by the booster piston, with the stepped piston (36) confining a work chamber and an intake chamber decreasing in size upon movement of the stepped piston (36) in the actuating direction, said intake chamber is in communication with the work chamber by way of a non-return valve with a conduit leading from said intake chamber to a non-pressurized container, which conduit is provided with a slip control valve, wherein a slip control is provided comprising said slip control valve (182) through which controlled hydraulic auxiliary pressure can be supplied to the intake chamber (56) decreasing in size upon movement of the stepped piston (36) in the actuating direction during slip control, wherein a second chamber enlarging upon movement of the stepped piston (36) in the actuating direction is confined by the stepped piston (36), which second chamber is in communication with said intake chamber (56) decreasing in size upon movement of the stepped piston (36) by way of a connecting line (142, 136) and wherein a shut-off valve is provided in the connecting line to shut off the enlarging second chamber during slip control; wherein the slip control valve (182), by way of which hydraulic auxiliary pressure can be fed to the intake chamber (56) decreasing in size upon movement of the stepped piston (36) in the actuating direction during slip control, is assembled so as to communicate with the said intake chamber by way of a control valve (84); wherein the shut-off valve (126) can be blocked in response to the controlled hydraulic auxiliary pressure; and, wherein the shut-off valve (126) comprises a shut-off piston (128) displaceable against the force of a spring, with the controlled hydraulic auxiliary pressure being applicable to one side of said shut-off piston.

2. A brake pressure generator according to claim 1, wherein a pressurizable container (184) supplies hydraulic pressure to the intake chamber (56) decreasing in size upon actuation.

3. A brake pressure control according to claim 2, wherein a controlled hydraulic auxiliary pressure can be fed to the work chamber (48) of the master cylinder (2) by way of said control valve (84) which work chamber is confined by master cylinder piston (36).

4. A brake pressure generator according to claim 3, wherein the master cylinder comprises an additional piston which confines a second work chamber (50) for another brake circuit and wherein controlled pressure can be fed to the work chamber (50) for the second brake circuit during slip control.

5. A brake pressure generator according to claim 4, comprising a tandem master cylinder wherein the stepped and additional pistons (36, 46) of the master cylinder are disposed in a series arrangement.

* * * * *